J. TURLEY.
Tug-Fastenings.

No. 135,299.          Patented Jan. 28, 1873.

UNITED STATES PATENT OFFICE.

JONATHAN TURLEY, OF MITCHELL, INDIANA.

IMPROVEMENT IN TUG-FASTENINGS.

Specification forming part of Letters Patent No. 135,299, dated January 28, 1873.

*To all whom it may concern:*

Be it known that I, JONATHAN TURLEY, of Mitchell, in the county of Lawrence and State of Indiana, have invented a new and Improved Trace and Whiffletree Connection; and I do hereby declare that the following is a full, clear, and exact description of the same, reference being had to the accompanying drawing forming a part of this specification.

The invention consists in a mode of connecting the traces and whiffletree by which horses draw a vehicle, plow, or cultivator so that no outer projection can come in contact with another object and catch thereinto. In plowing or cultivating among orchards it is extremely difficult, with the present modes of connecting the traces to the ends of whiffletrees, to avoid barking, fracturing, and injuring the young trees; vehicles also coming in very close proximity to one another, or to some other object, the end of the whiffletree is liable to catch and be the cause of more or less damage. It is the object of my invention to overcome and remedy these defects.

Figure 1:
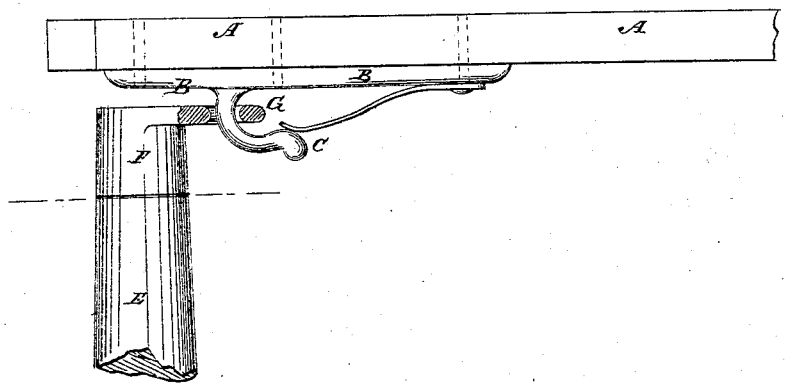
Figure 2:
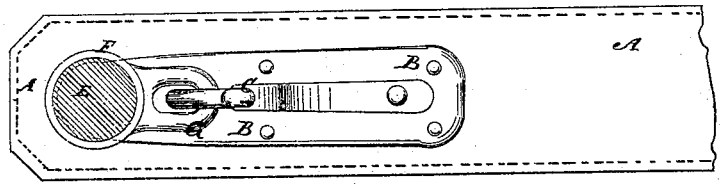

Figure 1 is a plan, and Fig. 2 a side view of my invention.

In the drawing, A represents a trace, to the inner side of which, and near but not quite to its rear end, is riveted or otherwise applied any suitable hook, spring-snap, or equivalent device, B C. E is a whiffletree, provided with an end sleeve, F, and loop G, having their front edges in the same vertical plane.

The application is as follows: The snap-hooks B C being placed in the eyes G, the trace A presents a smooth outside, and its rear end projects backwardly a little beyond the end of swingle-tree. By this arrangement it is impossible that the end of swingle-tree or of the snap-hook can catch on any object whatever.

Of course I do not claim any novelty in the construction of the hook, or sleeve with eye, but only my new mode of combining these old devices with the traces and swingle-tree, so as to produce a useful effect.

Having thus described my invention, what I claim is—

The combination of hook on inside and near rear end of trace with loop-sleeve F G arranged on end of whiffletree, as and for the purpose described.

JONATHAN TURLEY.

Witnesses:
GEORGE W. DODSON,
JOHN T. BIGGS.